No. 759,099. PATENTED MAY 3, 1904.
T. F. GRAHAM.
MEAT TRAY FOR BUTCHERS.
APPLICATION FILED FEB. 9, 1903.
NO MODEL. 2 SHEETS—SHEET 1.
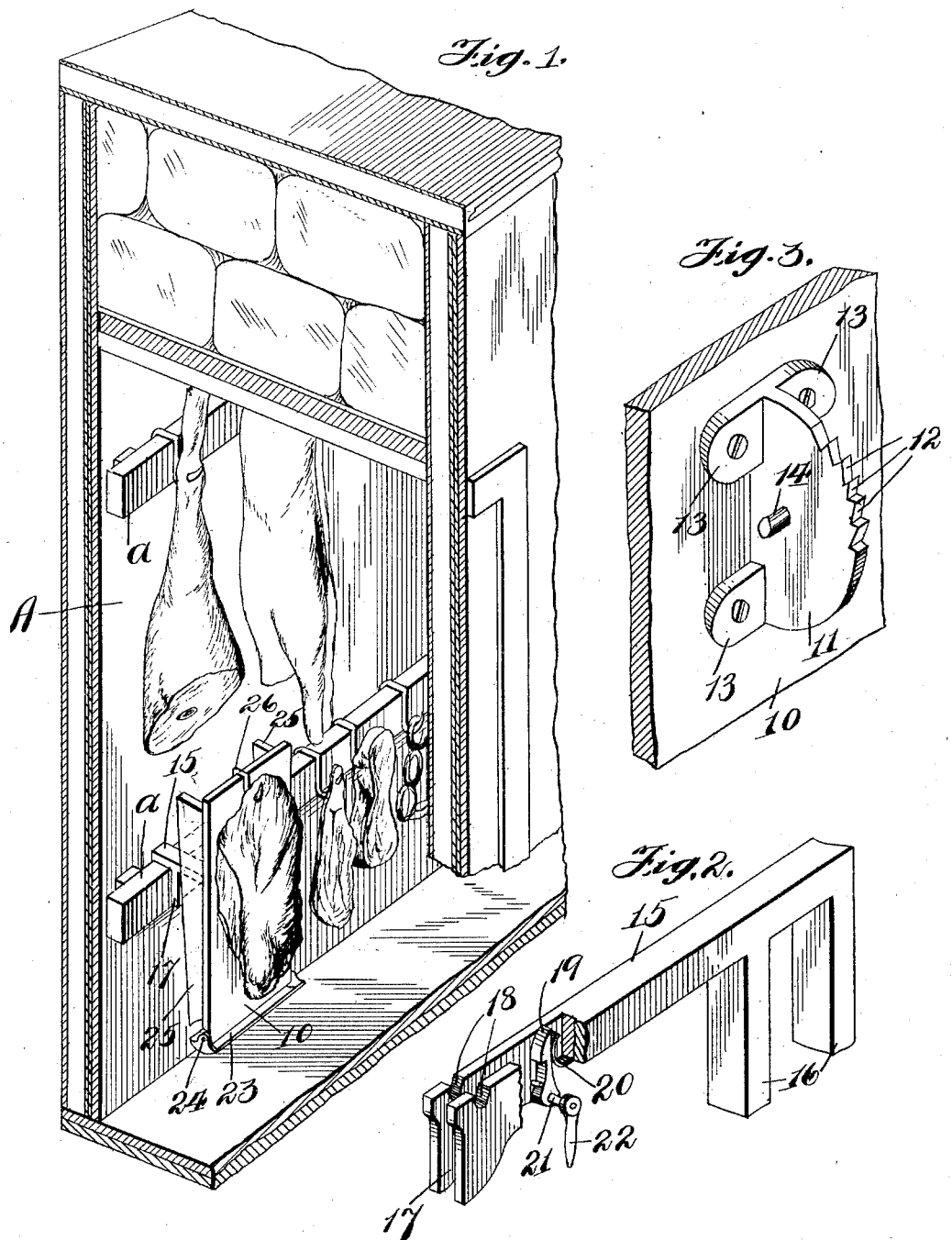
Witnesses:
Inventor:

No. 759,099. PATENTED MAY 3, 1904.
T. F. GRAHAM.
MEAT TRAY FOR BUTCHERS.
APPLICATION FILED FEB. 9, 1903.
NO MODEL. 2 SHEETS—SHEET 2.
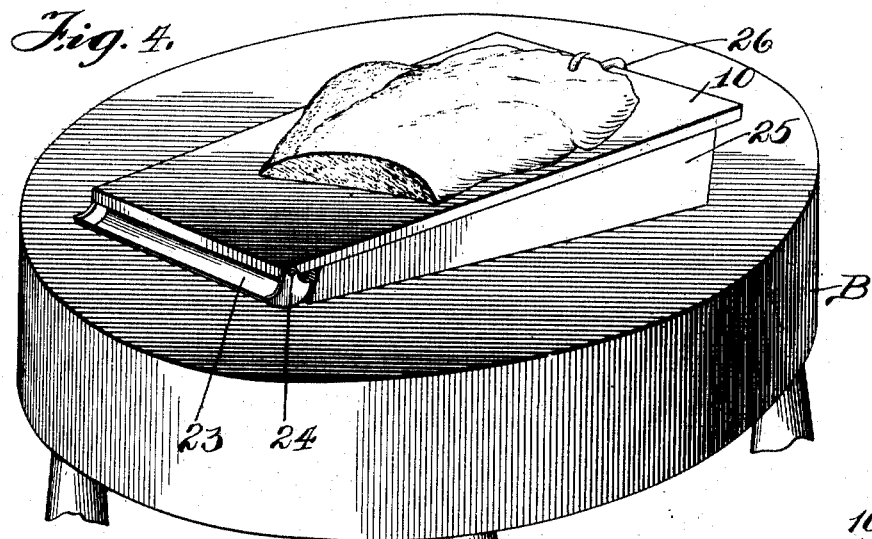
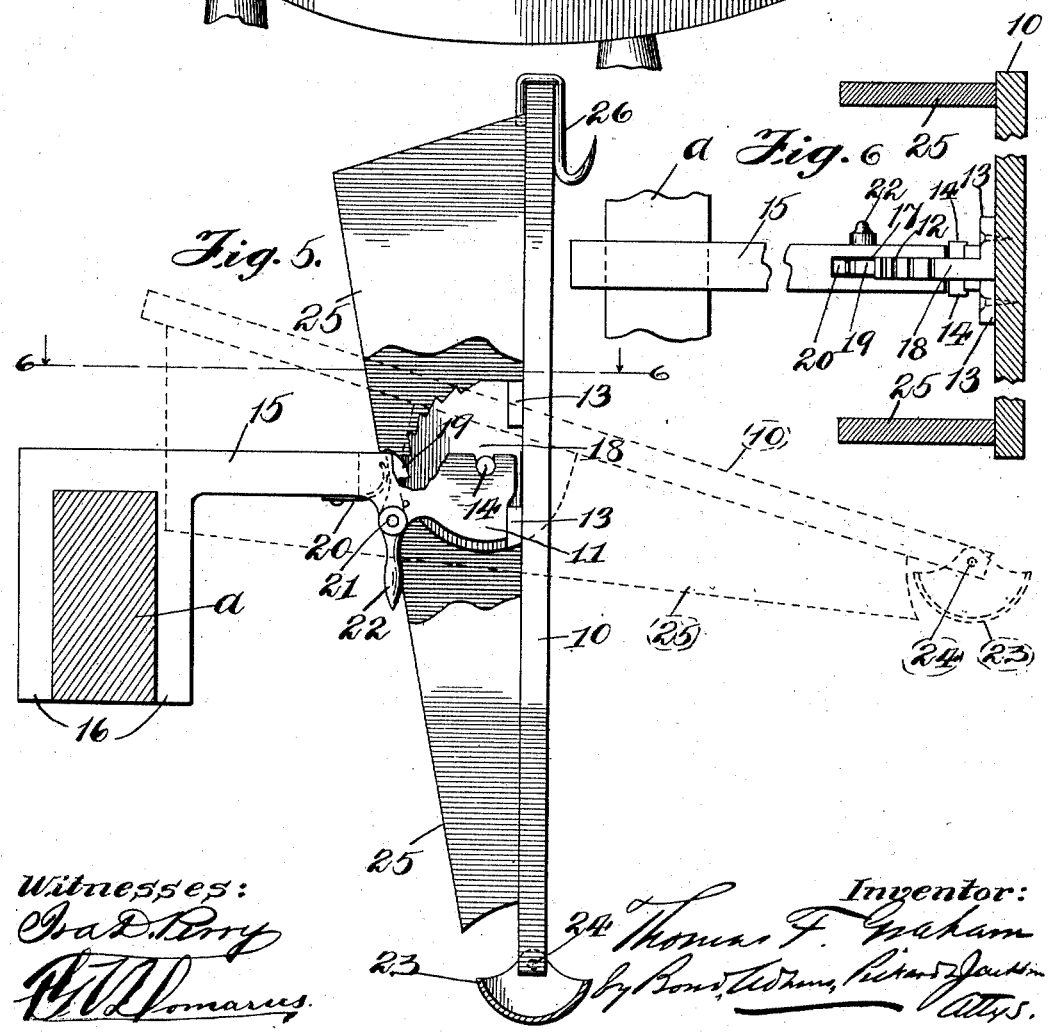
Witnesses:
Inventor: Thomas F. Graham No. 759,099.                                                                  Patented May 3, 1904.

UNITED STATES PATENT OFFICE.

THOMAS F. GRAHAM, OF CHICAGO, ILLINOIS.

MEAT-TRAY FOR BUTCHERS.

SPECIFICATION forming part of Letters Patent No. 759,099, dated May 3, 1904.

Application filed February 9, 1903. Serial No. 142,652. (No model.)

*To all whom it may concern:*

Be it known that I, THOMAS F. GRAHAM, a citizen of the United States, residing at Chicago, in the county of Cook and State of Illinois, have invented certain new and useful Improvements in Meat Hangers and Supports for Butchers, of which the following is a specification, reference being had to the accompanying drawings.

In the business of retail butcher-shops it is desirable that certain classes of meats be handled as little as possible, owing to the character of the flesh and the smearing of clothes, tables, &c., with blood. Livers are particularly objectionable on this account; and it is the object of my invention to provide a supporting-tray upon which such meats can be supported and to which they can be removably secured; to provide improved means for securing such tray with a liver or other piece of meat thereon to a beam or other support in an ice-box or refrigerator-room with the tray turned down out of the way; to provide means for turning such tray up while still attached to said beam or other support, so that slices or portions of meat can be cut from the piece of meat on the tray; to provide means for locking the tray in its raised position; to provide a connection between the tray and its supporting means that will permit the tray with the meat thereon to be readily lifted from such supporting means and placed on an ordinary butcher's table or block; to provide means for maintaining the tray in an inclined position when so placed on a table or block, and to provide at the lower end of the tray a trough for catching such blood as may flow down the tray from the piece of meat thereon. I accomplish these objects by the devices and combinations of devices illustrated in the accompanying drawings and hereinafter specifically pointed out.

That which I believe to be new will be set forth in the claims.

In said drawings, Figure 1 is a perspective view of a portion of the interior of a refrigerator room or chamber, showing my improved device removably secured to a beam that is attached to one of the walls of said room or chamber. Fig. 2 is a detail, being a perspective view of the hanger-bracket to which the tray is adapted to be removably attached, a portion of the bracket being broken away to show the locking-dog carried thereby. Fig. 3 is a detail, being a perspective view of a portion of the under side of the supporting-tray and the curved rack with which the locking-dog engages. Fig. 4 is a perspective view of the supporting-tray with a piece of meat thereon, the tray being removed from the hanger-bracket and resting upon a butcher's cutting-block. Fig. 5 is a side elevation of the supporting-tray with its hanger-bracket attached to a beam, as in Fig. 1, a portion of one side of the tray being broken away and showing in dotted lines the position of the tray when raised; and Fig. 6 is a cross-section at the line 6 6 of Fig. 5.

Referring to the several figures of the drawings, in which corresponding parts are indicated by the same reference characters, 10 indicates the meat-supporting tray, rectangular in shape and preferably formed of a single board.

11 indicates a rack, the teeth on the edge thereof being indicated by 12. This rack is secured to the under face of the tray in any suitable manner, it being secured in the form of construction illustrated by screws passing through ears 13, formed with the rack 12. The rack is secured at equal distances from the sides of the tray and nearer to the top than the bottom of the tray, as shown. 14 14 indicate studs projecting from the sides of the rack 11 and preferably cast with the rack. These studs constitute trunnions upon which the tray can be rocked.

15 indicates a hanger-bracket, preferably formed of a single casting, with a yoke 16 formed at one end, such yoke being of a size and shape to adapt it to straddle an ordinary beam, such as shown in Figs. 1 and 5 and indicated by *a*. At the opposite end the bracket is shown as divided by a central longitudinal opening 17 of a width to receive the rack 11, the studs 14 of such rack resting, when the parts are together, in suitable notches 18 18, formed in the upper edge of the divided portion of the bracket, such notches inclining slightly forward also, so that when the studs 14 are forced forward by the action of the spring, hereinafter referred to, they will be more securely held in place, as will be readily understood.

19 indicates a dog located in the opening 17 and adapted to be held in engagement with the teeth 12 of the rack 11 by a suitable spring, such as the one shown, which spring is indicated by 20. The dog 19 in the construction shown is secured to a short shaft 21, rotatably secured in the forward and divided portion of the bracket near the lower edge thereof, a handle 22 being provided on the projecting end of said shaft.

23 indicates a trough at the lower end of the tray, it being attached to the tray by pivots 24 passing through the raised sides of the trough and into the sides of the tray.

25 indicates inclined sides attached in the construction shown to the under face of the tray and adapted to so incline the tray when the tray is used as in Fig. 4 that all blood from the meat being cut will run down the face of the tray into the trough 23.

26 represents a hook of a character to be removably attached to the upper end of the tray and adapted to hold a liver or other piece of meat on the tray.

A indicates a refrigerator room or chamber of ordinary construction and provided with one or more of the beams $a$ referred to, which, as shown, are set out from the wall of the chamber sufficiently far to enable the yoke 16 to be secured over them.

B indicates an ordinary butcher's cutting-block.

If a tray with a piece of meat attached to it is secured in place in a refrigerator-room, as in Fig. 1, and it is desired to cut a portion of the meat off, the tray can be instantly raised to the position shown in dotted lines in Fig. 5 and will be held in that position by the engagement of the dog 19 with the rack. When the desired amount of meat has been cut off, the shaft 21 is to be turned by its handle 22, thus disengaging the dog from the rack and allowing the tray to be turned again on its trunnions to the position shown in Fig. 1 and also in full lines in Fig. 5. In neither case—that is, in turning the tray up or down—need the piece of meat be disconnected from the hook 26. Any blood escaping while the meat is being cut will by reason of the inclination of the tray run down and into the trough 26, which, owing to its pivotal connection with the tray, is always in proper position to receive and retain the blood. It is sometimes desirable that the cutting of the meat be performed outside of the refrigerator-room—either that the customer may see the meat or for other reasons—and in such case it is evident that the tray can be readily lifted from its bracket and with the meat still thereon be placed on a cutting-block, as B, and when so placed will be maintained rigidly, as the sides 25 will prevent the rack 11 from coming in contact with the cutting-block. These sides 25 will also give the tray the desired inclination, so that the blood may flow freely toward the pivoted trough, which trough, as will be seen by reference to Fig. 4, is also held sufficiently above the cutting-block, so as to be capable of turning freely on its pivots into proper receiving position.

That which I claim as my invention, and desire to secure by Letters Patent, is—

1. In a device of the character described, the combination with a supporting-tray, of means for securing a piece of meat thereto, a hanger-bracket having a yoke-shaped rear end adapted to straddle a suitable support, a pivotal connection between said tray and the forward end of said bracket, and means for adjustably securing said tray to said bracket, substantially as specified.

2. In a device of the character described, the combination with a supporting-tray, of a meat-hook carried by said tray, a hanger-bracket, a pivotal connection between said tray and said bracket, and means for adjustably securing said tray to said bracket, substantially as specified.

3. In a device of the character described, the combination with a supporting-tray, of means for securing a piece of meat thereto, means for holding said tray in a draining position, and a movable trough suspended from the lower end of said tray, substantially as specified.

4. In a device of the character described, the combination with a tray, of means for securing a piece of meat thereto, means for holding said tray in a draining position, and a pivoted trough at the lower end of said tray, substantially as specified.

5. In a device of the character described, the combination with a supporting-tray having a rack secured to the lower face of the tray, of a hanger-bracket, a pivotal connection between said tray and said bracket, a dog carried by said bracket and adapted to engage said rack, means pivoted to the upper end of the tray for securing a piece of meat to the face of the tray, and a trough at the lower end of the tray, substantially as specified.

6. A meat-cutting tray provided with adjustable means for holding it in a draining position, in combination with a movable trough connected to its lower end, substantially as specified.

7. A supporting-tray provided with means for holding it in a draining position, in combination with a trough pivotally attached to the lower end of the tray, substantially as specified.

THOMAS F. GRAHAM.

Witnesses:
A. H. ADAMS,
HELEN N. COLLIN.